United States Patent
Hannah (10) Patent No.: US 6,823,023 B1
(45) Date of Patent: Nov. 23, 2004

(54) SERIAL BUS COMMUNICATION SYSTEM (75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/495,264

(22) Filed: Jan. 31, 2000

(51) Int. Cl.[7] .............................................. H04L 25/49
(52) U.S. Cl. ...................................................... 375/296
(58) Field of Search ................................. 375/296, 278, 375/284, 285, 346

(56) References Cited

U.S. PATENT DOCUMENTS

| | | | |
|---|---|---|---|
| 6,140,822 A | * 10/2000 | Williams | .................... 324/620 |
| 6,194,942 B1 | * 2/2001 | Yu et al. | ..................... 327/317 |
| 6,285,859 B1 | * 9/2001 | Duran et al. | .................. 455/63 |
| 6,373,902 B1 | * 4/2002 | Park et al. | .................. 375/296 |
| 6,516,025 B1 | * 2/2003 | Warke et al. | ................ 375/222 |

* cited by examiner

*Primary Examiner*—Stephen Chin
*Assistant Examiner*—Kevin Kim
(74) *Attorney, Agent, or Firm*—Trop, Pruner & Hu, P.C.

(57) ABSTRACT

A method includes determining a first transfer function that characterizes a distortion introduced by a serial bus. A filter is designed to substantially cancel the distortion introduced by the first transfer function, and a signal is transmitted to the serial bus through the filter.

15 Claims, 7 Drawing Sheets

SERIAL BUS COMMUNICATION SYSTEM

BACKGROUND

The invention relates to a serial bus communication system.

A serial bus typically distorts signals that propagate across the bus. For example, the serial bus may include conductive signal lines (copper lines, for example) to communicate digital signals from a transmitter to a receiver. The signal lines typically introduce a dispersive transfer function to the fourier components of the digital signals. As a result of this dispersive transfer function, data communication may not exceed a maximum data communication rate (typically expressed in terms of Megabits/sec Kilometer). Otherwise, if communication of the data above the maximum data communication rate is attempted, the lines may attenuate the magnitudes of the digital signals and shift the phases of the digital signals to fully close the receiver's "eye opening," an opening established by the time that is available at the receiver to re-clock the data and the voltage difference at the receiver between the logic one and the logic zero voltage levels.

Several techniques may be used to compensate for the distortion that is introduced by the serial bus. For example, a technique called adaptive equalization may be used. With adaptive equalization, the distorted digital signals are received from the lines of the serial bus and are routed through analog filters that are coupled between the lines of the serial bus and the receiver. These analog filters apply gain/loss factors and phase shifts to the distorted digital signals for purposes of removing the distortion. However, a potential problem with this approach is the cost and complexity that are associated with analog filtering.

Another technique to compensate for the distortion that is introduced by the serial bus is pre-compensation, a technique in which a distortion function is applied to each digital signal before the digital signal is communicated to the signal line of the serial bus. Due to this compensation, the digital signals should appear relatively undistorted near the receiver. However, in the past, an estimation of the distortion that is introduced by a particular line of the serial bus was used to develop pre-compensation filters to reduce the distortion. Unfortunately, this estimation may be imprecise, and to the extent that the estimation is incorrect, the digital signal may appear substantially distorted at the receiver.

Thus, there is a continuing need for an arrangement to more precisely compensate for distortion that is introduced by a serial bus.

DETAILED DESCRIPTION

Figure 1:
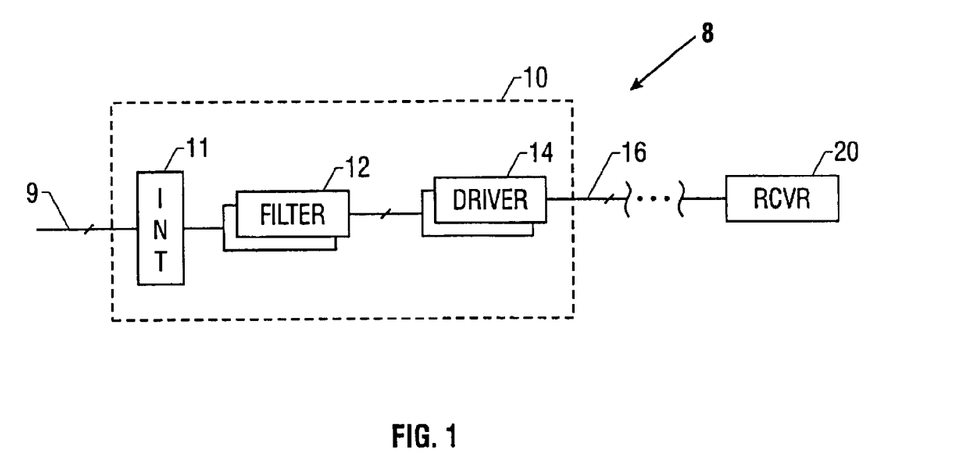
FIG. 1 is a schematic diagram of a serial bus communication system according to an embodiment of the invention.

Referring to FIG. 1, an embodiment 8 of a serial bus communication system in accordance with the invention includes a transmitter 10 that is constructed to pre-compensate digital signals before communicating the digital signals to conductive signal lines of a serial bus 16. In this manner, the serial bus 16 distorts signals that propagate over the serial bus 16. However, as described below, the transmitter 10 includes a filter 12 for each conductive signal line of the serial bus 16, and each filter 12 is designed to specifically pre-compensate for the distortion that is introduced by the associated signal line. In this manner, in some embodiments, each filter 12 (a digital signal processing filter, for example) receives an indication of a particular digital signal from an interface 11 of the transmitter 10. The filter 12 introduces the appropriate distortion to the signal to pre-compensate the signal to cancel the distortion that is introduced by the associated signal line of the serial bus 16. Due to this arrangement, a receiver 20 (of the system 8) may receive substantially undistorted signals from the serial bus 16.

More particularly, in some embodiments, each signal line (a copper line, for example) of the serial bus 16 has electrical characteristics that may be modeled by the following partial differential equations:

$$\partial_z v[z,t] = -ri[z,t] - l\partial_t i[z,t], \text{ and} \qquad \text{Equation 1}$$

$$\partial_z i[z,t] = -gv[z,t] - c\partial_t v[z,t] \qquad \text{Equation 2}$$

where "v[z,t]" and "i[z,t]" represent the voltage and current, respectively, at a particular position z along the signal line at time t; "r" represents a resistance of the line; "g" represents the leakage conductance of the insulation that surrounds the line; "l" represents an inductance of the line; and "c" represents a capacitance of the line. The "r," "g," "l," and "c" values may be expressed as a per unit quantity. For example, "r" may represent a resistance per inch.

Figure 2:
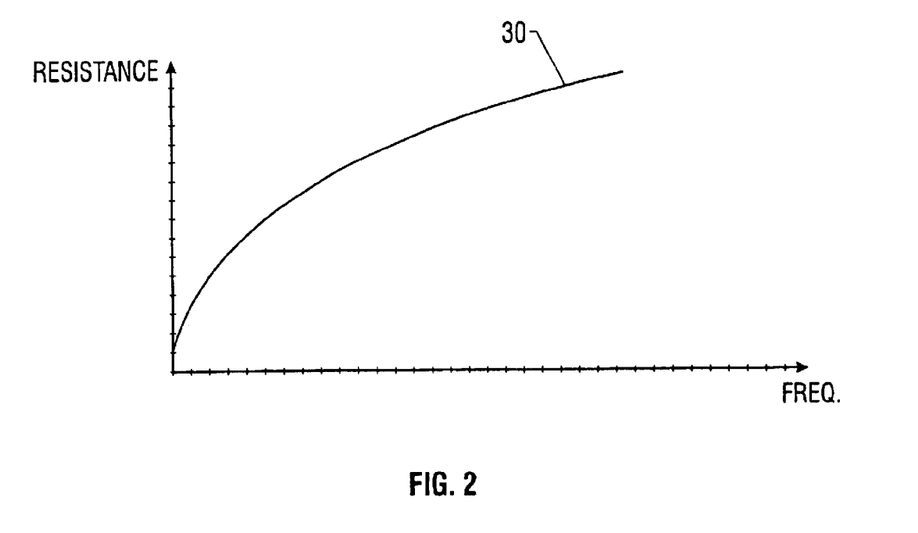
FIG. 2 is a resistance versus frequency plot for a conductive signal line of the serial bus of FIG. 1.

The resistance of the signal line varies with frequency due to the skin depth effect. Taking this variation into account, a simple electrical model of the signal line may be a model in which the insulation that surrounds the signal line has no leakage (g=0), and the signal line has a resistance that changes with frequency (due to the skin depth effect), as described by the following equations:

$$r_{internal} = \begin{cases} r_{dc}(1 - if/f_0), & f \leq f_0 \\ r_{dc}\sqrt{f/f_0} \cdot (1-i), & f > f_0 \end{cases} \qquad \text{Equation 3}$$

where "$r_{dc}$" is the DC resistance of the signal line, and "$f_0$" is a frequency near 1 Megahertz (MHz). The skin depth effect increases the resistance per unit length of the signal line and also adds an incremental inductive reactance. Equation 3 may be used to derive a resistance plot 30 that is depicted in FIG. 2. As shown, the resistance of the signal line increases with increasing frequency. A more accurate cable model may be determined by directly measuring the resistance (and incremental inductance) per unit length. However, for purposes of simplicity, the model derived from Equation 3 is described herein.

Figure 3:
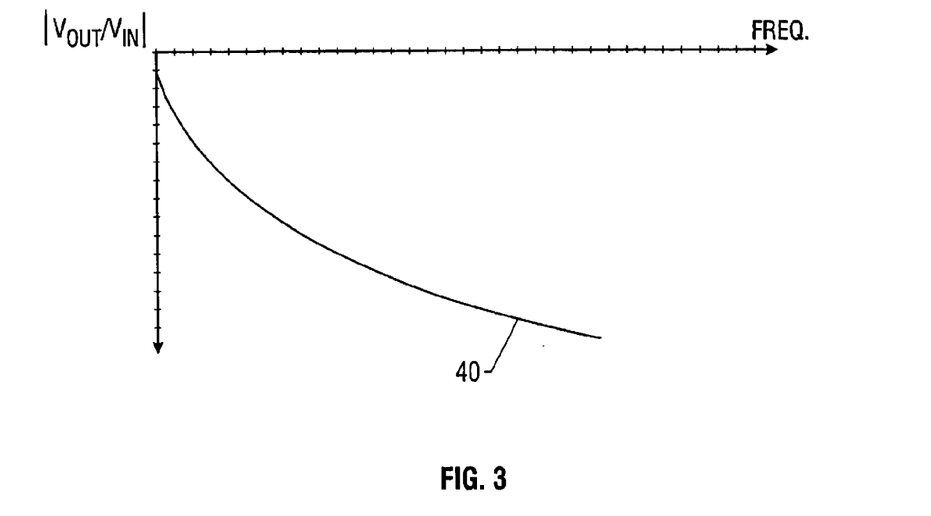
FIG. 3 is a magnitude plot of a distortion introduced by the serial bus of FIG. 1.
Figure 4:
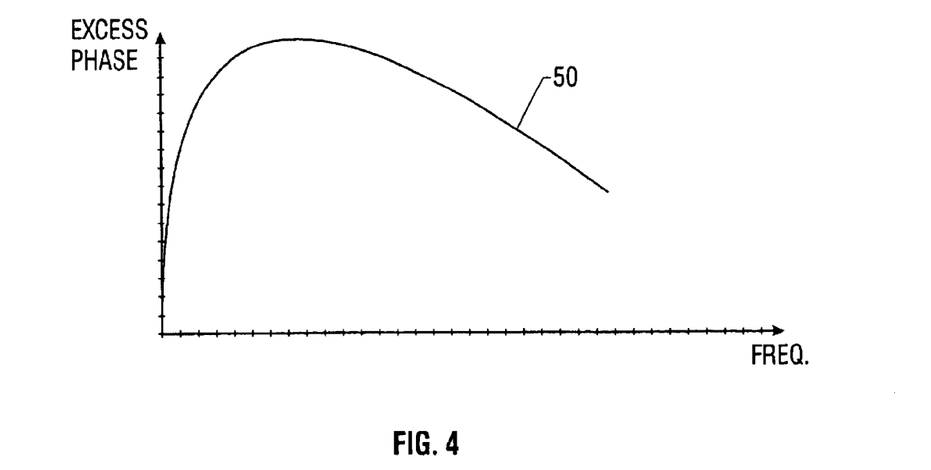
FIG. 4 is a phase plot of the distortion introduced by the serial bus of FIG. 1.

Thus, using this model, a transfer function that characterizes the distortion that is introduced by the signal line may be derived. In this manner, a magnitude plot 40 of this transfer function is depicted in FIG. 3, and as shown, the magnitude of the transfer function decreases with increasing frequency. Besides changing the magnitude of the signal, the signal line also introduces an "excess phase shift," a term that may be defined as the phase shift of a sine wave propagating through the signal line that is over and beyond the simple phase shift coming from the propagation time of the line. A plot 50 of the excess phase is depicted in FIG. 4. Thus, the plots 40 and 50 define the transfer function that characterizes a distortion that may be introduced by a signal line of the serial bus 16.

Figure 5:
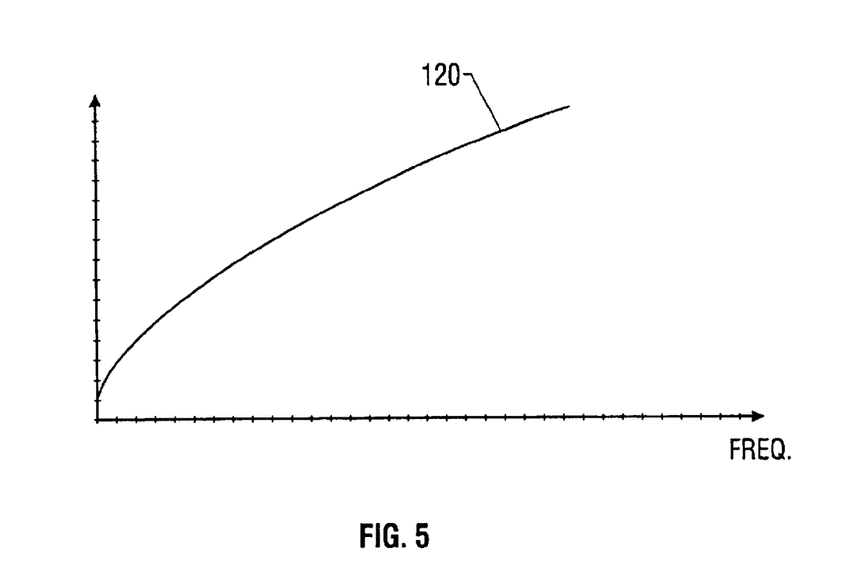
FIG. 5 is a magnitude plot of the frequency response of a pre-compensation filter of FIG. 1.
Figure 6:
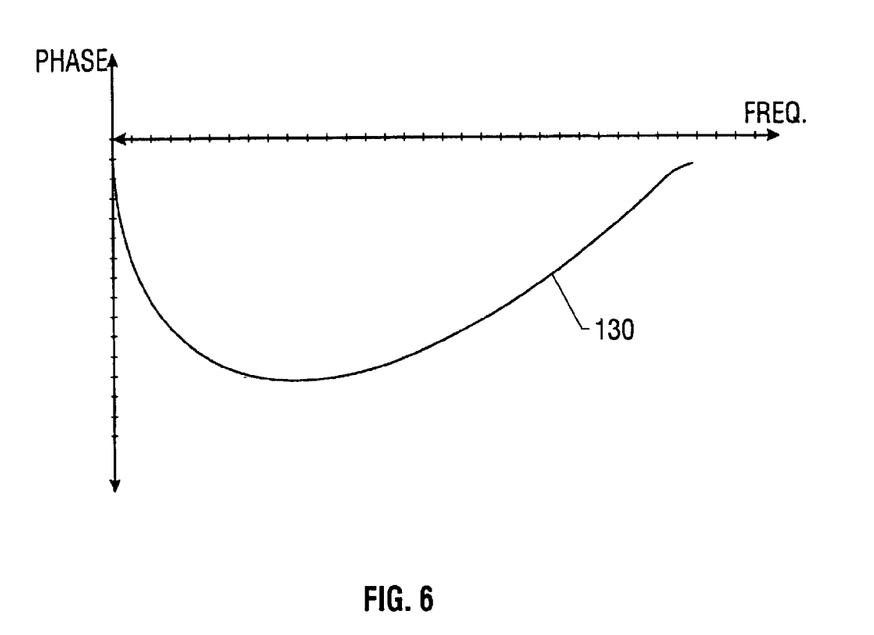
FIG. 6 is a phase plot of the frequency response of the pre-compensation filter of FIG. 1.

Due to the above-described mathematical modeling of the signal line, the transfer function of the filter 12 (see FIG. 1) may be designed. In this manner, in some embodiments, the filter 12 is constructed to impart a transfer function that is the exact reciprocal of the transfer function of the line (depicted in FIGS. 3 and 4), neglecting the propagation phase shift. Because of its transfer function, the filter 12 substantially compensates for the distortion that is introduced by the signal line. Thus, a magnitude plot 120 (see FIG. 5) of the transfer function of the filter 12 is mathematically the inverse of the magnitude plot 40 (see FIG. 3) of the conductive line, i.e., the combination of the two transfer functions produces a gain of unity. Similarly, an excess phase plot 130 (see FIG. 6) of the transfer function of the filter 12 is an inverse of the excess phase plot 50 of the signal line, i.e., the combination of the two transfer functions produces an excess phase shift of zero degrees.

Figure 7:
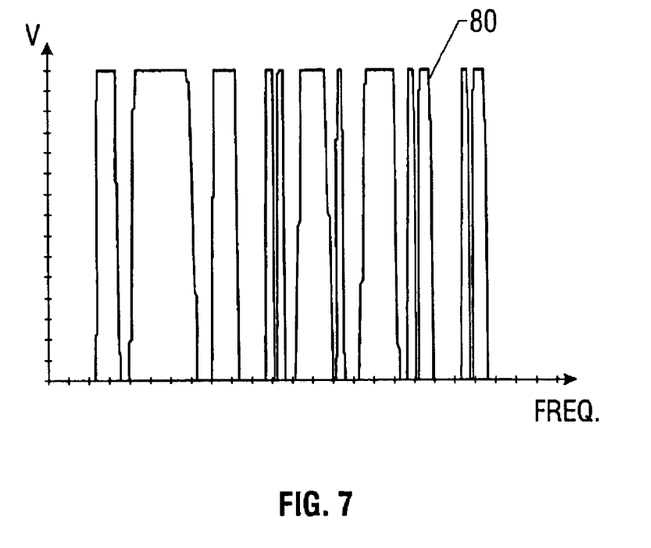
FIG. 7 is a waveform illustrating a signal that is furnished to the serial bus.
Figure 8:
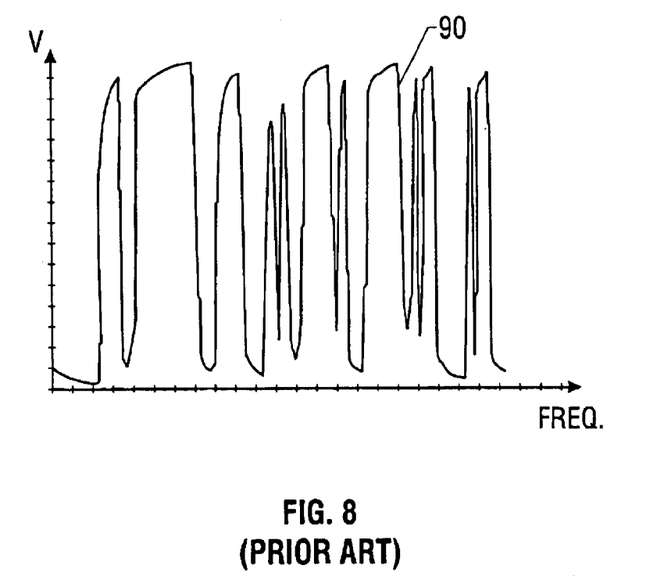
FIG. 8 is a waveform illustrating a signal that is received from the serial bus according to the prior art.

The use of the filter 12 is to be contrasted to an arrangement that does not compensate for the distortion that is introduced by the signal line. To illustrate this point, a simulation was performed in which a non-return-to-zero (NTZ) signal 80 (see FIG. 7) was communicated to a signal line at one end to form a corresponding signal 90 (see FIG. 8) at the other end of the signal line. Comparing the signals 80 and 90, it is noted that the signal line both introduces a propagation delay and distorts any otherwise well-defined logic transitions in the signal 80. Due to this distortion, the data eye at the receiver may be substantially minimized.

Figure 9:
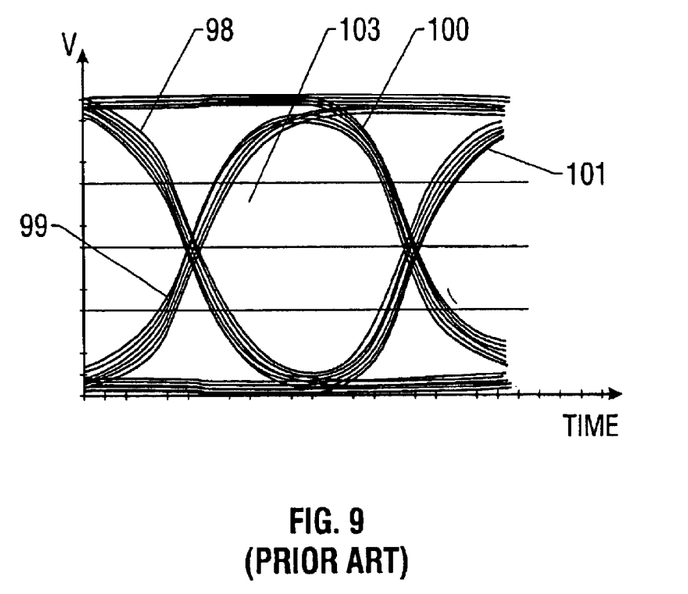
FIG. 9 is a receiver data eye diagram according to the prior art.

To demonstrate this point, the following simulation was conducted to produce a data eye 103 that is depicted in FIG. 9. In this simulation, uncompensated signals that have a logic one to logic zero transition at ideally time $T_1$ were communicated across the signal line to produce signals 100. Similarly, uncompensated signals that have a logic zero to logic one transition at ideally time $T_1$ were communicated across the conductive line to produce signals 101 that are also plotted in FIG. 9. To complete the plot of the data eye 103, uncompensated signals that have a logic one to logic zero transition at ideally time $T_0$ were communicated across the conductive line to produce signals 99 that appear in FIG. 9; and uncompensated signals that have a logic zero to logic one transition at ideally time $T_0$ were communicated across the conductive line to produce signals 98 that are also plotted in FIG. 9. Thus, as shown, without compensation of the distortion that is introduced by the serial bus, the logic transitions have large rise and fall times that decrease the size of the data eye 103 and degrade the quality of data communication across the serial bus 16.

Figure 10:
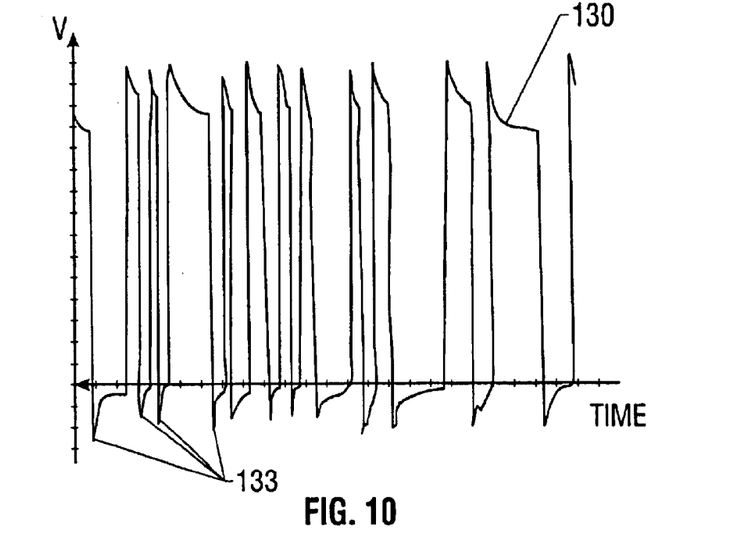
FIG. 10 is a waveform of a pre-compensated signal according to an embodiment of the invention.
Figure 12:
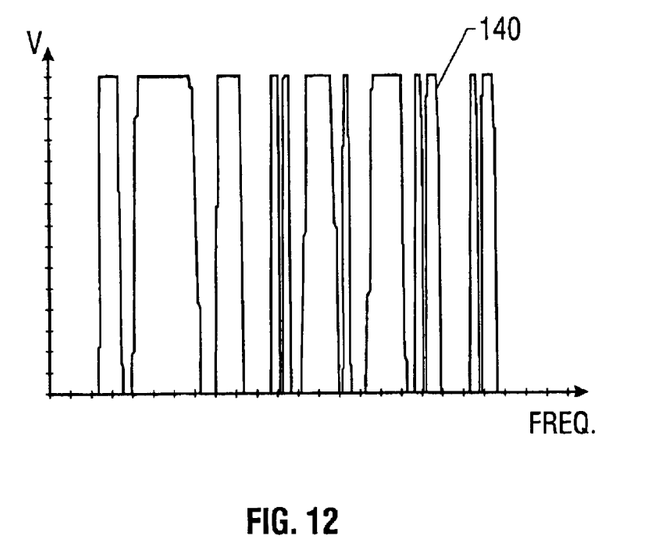
FIG. 12 is a waveform illustrating a signal that is received from the serial bus of FIG. 1 according to an embodiment of the invention.

The above-described results are to be compared to the simulated signals that occur with the use of the filter 12. In this manner, FIG. 10 depicts a signal 130 (at the output terminal of the transmitter 10) that is generated by passing the uncompensated signal 80 (see FIG. 7) through the filter 12. As shown, the signal 130 includes overshoots 132 and undershoots 133 on its rising and falling edges, respectively. However, the signal 130, when routed through a signal line of the serial bus 16, produces a signal 140 (see FIG. 12) near the receiver 20. The signal 140 is a near duplicate to the uncompensated signal 80.

Figure 11:
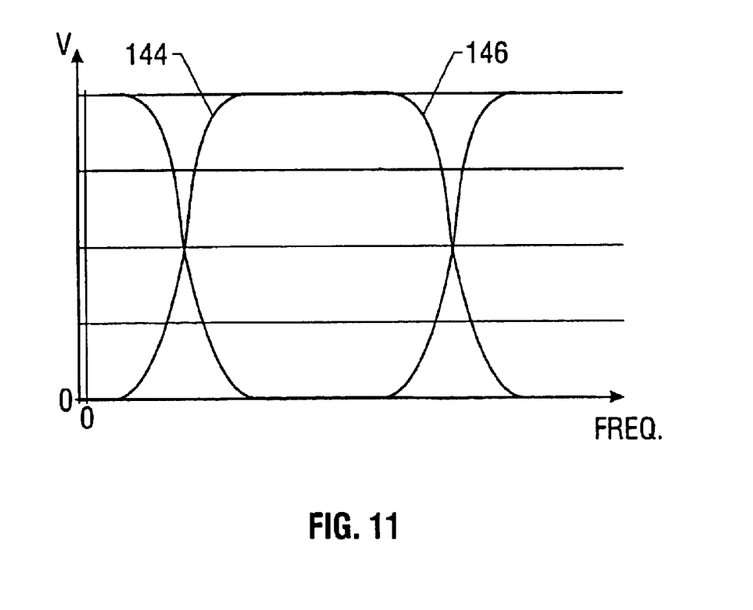
FIG. 11 is a receiver eye diagram according to an embodiment of the invention.

Thus, by using the filter 12, a data eye diagram that is plotted in FIG. 11 may be obtained. The data eye diagram may be formed from complementary signals 144 and 146 and demonstrates the minimal dispersion that occurs with the use of the pre-compensation filter 12.

Figure 13:
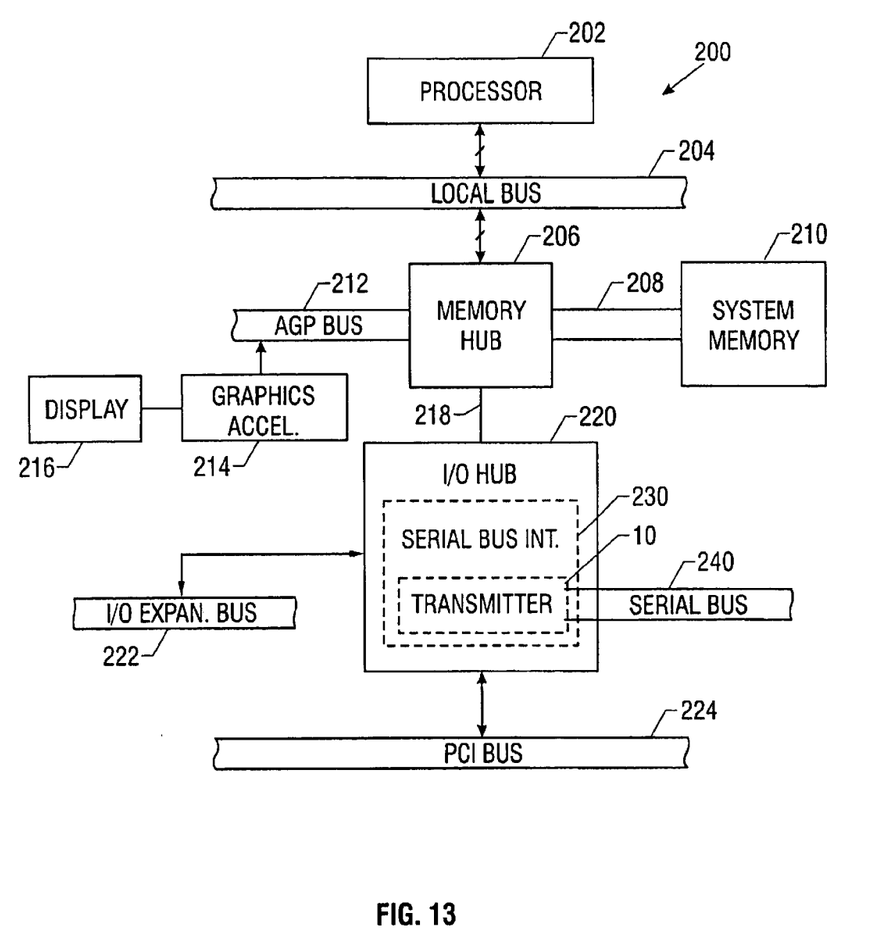
FIG. 13 is a schematic diagram of a computer system according to an embodiment of the invention.

Referring to FIG. 13, in some embodiments, the transmitter 10 may be part of a computer system 200. In this manner, the computer system 200 may include a processor 202 (a microprocessor, for example) that is coupled to a local bus 204. Also coupled to the local bus 204 is a north bridge, or memory hub 206, that interfaces the local bus 204 to a memory bus 208 that is coupled to a system memory 210. The memory hub 206 also provides interfaces, for example, to an Accelerated Graphics Port (AGP) bus 212 and a hub link 218. A graphics accelerator 214 is coupled to the AGP bus 212 and may drive a display 216. The AGP is described in detail in the Accelerated Graphics Port Interface Specification, Revision 1.0, published on Jul. 31, 1996, by Intel Corporation of Santa Clara, Calif.

The hub link 218 establishes communication between the memory hub 206 and an input/output (I/O) hub 220 that functions as a south bridge. In this manner, the I/O hub 220 may provide an interface to an I/O expansion bus 222 and a Peripheral Component Interconnect (PCI) bus 224. The PCI Specification is available from The PCI Special Interest Group, Portland, Oreg. 97214.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:

a serial bus to propagate an unmodulated digital signal, the serial bus capable of introducing a distortion characterized by a first frequency response;

a receiver coupled to the serial bus to receive the unmodulated digital signal; and a transmitter coupled to the serial bus to transmit the unmodulated digital signal, the transmitter including a filter having a second frequency response to substantially cancel the distortion introduced by the serial bus.

2. The system of claim 1, wherein the first frequency response is substantially an inverse of the second frequency response.

3. The system of claim 1, wherein the distortion is caused at least in part by a skin depth effect of a conductive line of the serial bus.

4. The system of claim 1, wherein the first frequency response has a first magnitude that is substantially an inverse of a second magnitude of the second frequency response.

5. The system of claim 1, wherein the first frequency response has a first phase that is substantially an inverse of a second phase of the second frequency response.

6. A method comprising:

determining a first frequency response that characterizes a distortion introduced by a serial bus to an unmodulated digital signal that propagates along the serial bus;

designing a filter to have a second frequency response to substantially cancel the distortion; and transmitting a signal to the serial bus through the filter.

7. The method of claim 6, wherein the first frequency response is an inverse of the second frequency response.

8. The method of claim 6, wherein the distortion is caused at least in part by a skin depth effect of a conductive line of the cable.

9. The method of claim 6, wherein the first frequency response has a first magnitude that is substantially an inverse of a second magnitude of the second frequency response.

10. The method of claim 6, wherein the first frequency response has a first phase that is substantially an inverse of a second phase of the second frequency response.

11. A serial bus transmitter comprising:

a driver to communicate a first unmodulated digital signal to a serial bus, the serial bus having a distortion characterized by a first frequency response;

a filter coupled to the driver, the filter having a second frequency response to substantially cancel out the distortion.

12. The transmitter of claim 11, wherein the first frequency response is an inverse of the second frequency response.

13. The transmitter of claim 11, wherein the first frequency response has a first magnitude that is substantially an inverse of a second magnitude of the second frequency response.

14. The transmitter of claim 11, wherein the first frequency response has a first phase that is substantially an inverse of a second phase of the second frequency response.

15. The transmitter of claim 11, wherein the distortion is caused at least in part by a skin depth effect of a conductive line of the cable.

* * * * *